(12) United States Patent
Boeuf

(10) Patent No.: US 7,007,241 B2
(45) Date of Patent: Feb. 28, 2006

(54) DISPLAY DEVICE WITH A FOCUS BUOY FACILITY

(75) Inventor: Patrick Gaston Joseph Boeuf, La Gaude (FR)

(73) Assignee: Lenovo (Singapore) Pte. Ltd., Singapore (SG)

(*) Notice: Subject to any disclaimer, the term of this patent is extended or adjusted under 35 U.S.C. 154(b) by 502 days.

(21) Appl. No.: 09/840,956

(22) Filed: Apr. 24, 2001

(65) Prior Publication Data

US 2002/0080185 A1 Jun. 27, 2002

(30) Foreign Application Priority Data

May 12, 2000 (FR) ..................... 00 48004

(51) Int. Cl.
*G06F 3/00* (2006.01)
*G06F 9/00* (2006.01)
*G06F 17/00* (2006.01)

(52) U.S. Cl. ............... 715/802; 715/790; 715/795; 715/863

(58) Field of Classification Search ........... 345/805, 345/802, 711, 794, 859, 767, 779, 790, 788, 345/804, 762

See application file for complete search history.

(56) References Cited

U.S. PATENT DOCUMENTS

| | | | | |
|---|---|---|---|---|
| 4,868,765 A | * | 9/1989 | Diefendorff | 345/797 |
| 4,939,507 A | * | 7/1990 | Beard et al. | 345/156 |
| 5,265,202 A | * | 11/1993 | Krueger et al. | 345/797 |
| 5,515,496 A | * | 5/1996 | Kaehler et al. | 345/762 |
| 5,760,773 A | * | 6/1998 | Berman et al. | 345/808 |
| 5,920,316 A | * | 7/1999 | Oran et al. | 345/779 |
| 6,133,898 A | * | 10/2000 | Ludolph et al. | 345/790 |
| 6,133,918 A | * | 10/2000 | Conrad et al. | 345/804 |
| 6,215,490 B1 | * | 4/2001 | Kaply | 345/788 |
| 6,714,222 B1 | * | 3/2004 | Bjorn et al. | 345/839 |

* cited by examiner

*Primary Examiner*—Kristine Kincaid
*Assistant Examiner*—Boris Pesin
(74) *Attorney, Agent, or Firm*—Ojanen Law Offices; Les Payne

(57) ABSTRACT

Data processing system comprising at least a processing unit executing simultaneously a number of application programs, a memory for storing the application programs, a display subsystem for displaying on a screen a plurality of windows associated respectively with a plurality of application programs, each window being able to overlay partially or totally one or several windows already displayed on the screen, and a mouse for moving a cursor to a selected location of the screen. The display subsystem displays a focus buoy associated with each window at the same time the window is displayed, stores the coordinates of the location at which the focus buoy is displayed in a table in the memory, and in response to simply shaking the mouse, displays the focus buoys at each location defined in the table.

17 Claims, 3 Drawing Sheets

DISPLAY DEVICE WITH A FOCUS BUOY FACILITY

TECHNICAL FIELD

The invention relates to the data processing systems wherein a plurality of windows corresponding to a plurality of application programs being executed simultaneously may be displayed at the same time, and relates in particular to a display device with a focus buoy facility.

BACKGROUND ART

Today data processing systems have multiwindow functions to perform a simultaneous processing of a plurality of processes under the control of a plurality of application programs.

The conventional multiwindow control method as described in JP-A-60,205,492 and JP-A-57,125,989 provides a scheme to discriminate visible windows. In such a method, a window to which data can be input or a current window is distinguished on the screen from a non-current window (wherein data cannot be input) by using a different brightness or luminance or by highlighting the data of the current window. However, a case where a window is completely covered by other windows and becomes invisible to the operator has not been considered in these patent applications. U.S. Pat. No. 5,179,655 provides a multiwindow control method an apparatus to process a window concealed by other windows when a plurality of windows are generated on the screen of a workstation. Namely, there is being provided a window display area taking precedence over all other display areas so that during operations of generating a new window or altering the window size of a beforehand generated window, etc . . . , any concealed window becomes represented by an icon placed in such window display area that an operator may recognize and identify as the concealed window.

However, it has not been considered, according to the prior art technology above, that a work station screen becomes very often hardly readable because the window display area taking precedence over all other display areas is rapidly filled with icons representing concealed windows. It becomes difficult for the operator to retrieve a particular concealed window of interest, especially given the necessary small size of icons. And yet, at any given time, an operator very frequently has a particular application associated to a particular window, which he considers to be the "main application at such time", and which he would like to be able to retrieve rapidly from any secondary applications and windows.

SUMMARY OF THE INVENTION

Accordingly, the object of the invention is to provide a data processing system wherein the display device is equipped with a focus buoy facility enabling the user to focus easily any window amongst a plurality of windows displayed at the same time on the screen.

The invention relates therefore to a data processing system comprising at least a processing unit capable of executing simultaneously a number of application programs, a memory for storing the application programs, a display subsystem for displaying on a screen a plurality of windows associated respectively with a plurality of application programs, each window being able to overlay partially or totally one or several windows already displayed on the screen, and a mouse for moving a cursor to a selected location of the screen. The display subsystem comprises first displaying means for displaying on the screen a focus buoy associated with each window at the same time the window is displayed on the screen, a table in the memory for storing for each window the coordinates of the location at which is displayed the buoy associated with the window, second displaying means for displaying a buoy at each location defined in the table in response to simply shaking of the mouse, whereby the user of the system may click any one of the displayed buoys in order to get the focus of the associated window.

BRIEF DESCRIPTION OF THE DRAWINGS

The present invention will be apparent from the following detailed description taken in conjunction with the accompanying drawings wherein.

DETAILED DESCRIPTION OF THE INVENTION

Figure 1:
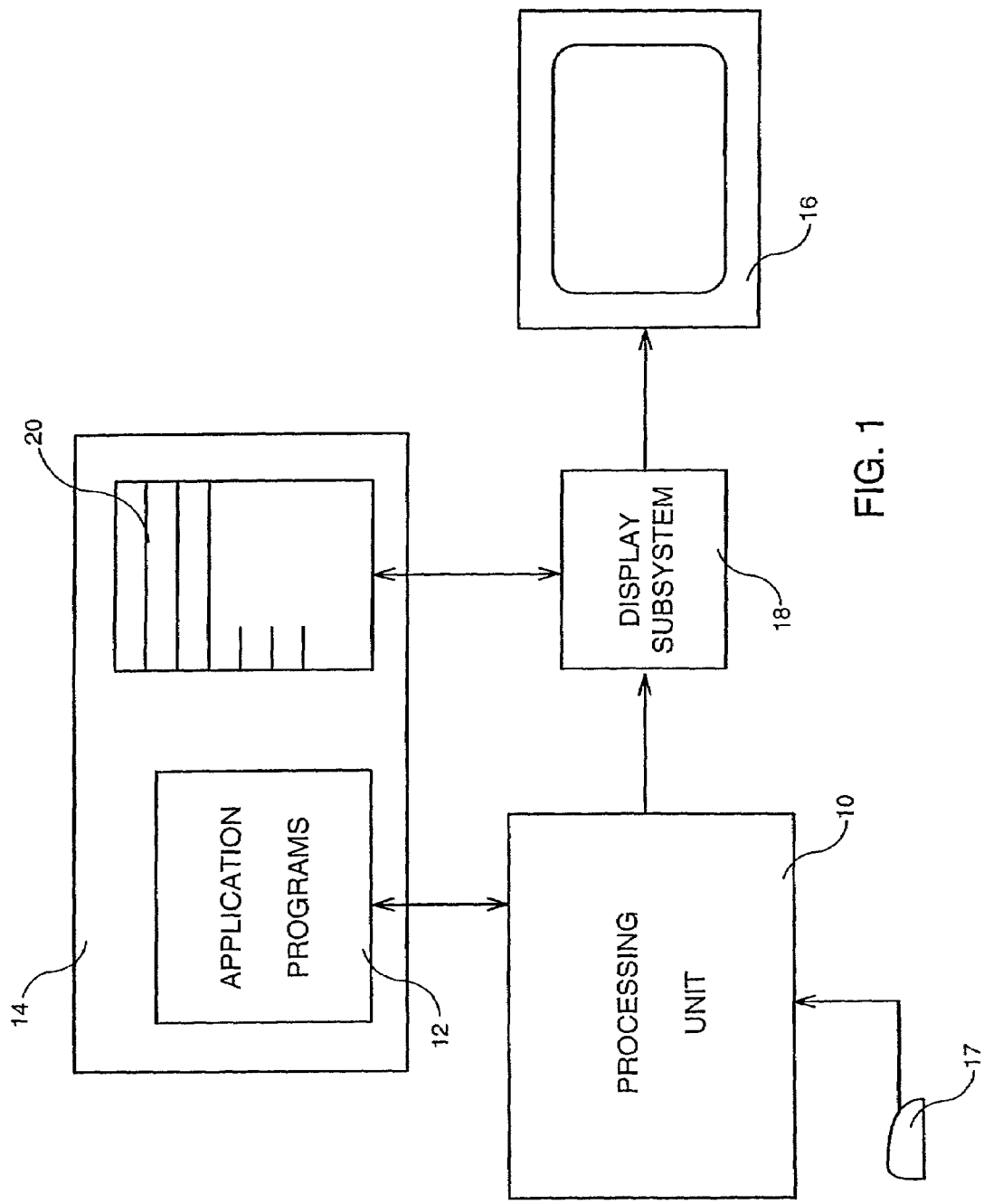
FIG. 1 is a block-diagram of a data processing system wherein the invention is implemented.

The invention is implemented in a data processing system illustrated in FIG. 1 comprising at least a processing unit able to execute simultaneously a plurality of application programs 12 stored in a memory 14, a screen 16 on which can be displayed a plurality of windows corresponding to the application programs being executed at the same time and a mouse 17 for moving the cursor on screen 16. A display subsystem 18 comprising the control means necessary to manage the data to be displayed and wherein are implemented the features of the invention is interconnected between processing unit 10 and screen 16. Each time a window is displayed on screen 16, a focus buoy is also displayed and data related to the displayed buoy are registered in a table 20 stored in memory 14. The data registered for each window are at least the identification of the application program (AP) involved, a pointer to the corresponding window, and the location of the focus buoy by the indication of the row (r) and the column (c) of the starting edge of the buoy. Thus, assuming that three windows are successively displayed on the screen, the entries $W_1, W_2, W_3$ of the table are the following:

| $W_1$ | $AP_1$ | pointer 1 | $r_1, c_1$ |
| $W_2$ | $AP_2$ | pointer 2 | $r_2, c_2$ |
| $W_3$ | $AP_3$ | pointer 3 | $r_3, c_3$ |

Figure 2A:
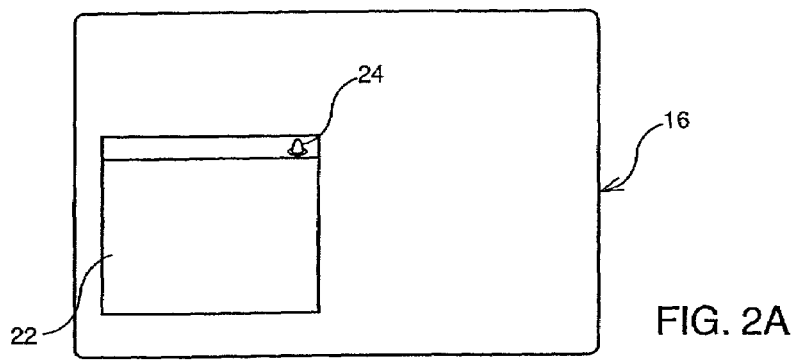
FIGS. 2A–2D are schematic representations of the screen where a first window is displayed, a second window overlying the first window is displayed, a third window overlying the second window is displayed, and of the screens with the focus buoys after shaking the mouse.

The principles of the invention are now explained in reference to FIGS. 2A–2D. In FIG. 2A, a first window 22 corresponding to a first application program is displayed on screen 16. A focus buoy 24 is also displayed at the right of a row located at the top of the window. It must be noted that the buoy might be displayed at any location of the window and even beside the window.

Figure 2B:
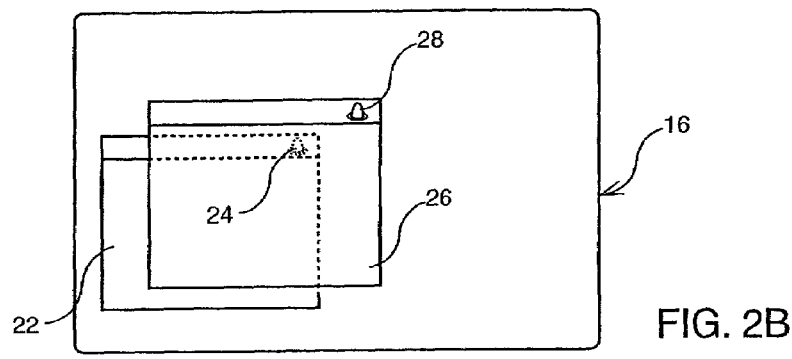

Then, as illustrated in FIG. 2B, a second window 26 corresponding to a second application program and overlying partially the first window 22 is displayed on screen 16. A focus buoy 28 is also displayed at the top of the window as for the first window.

Figure 2C:
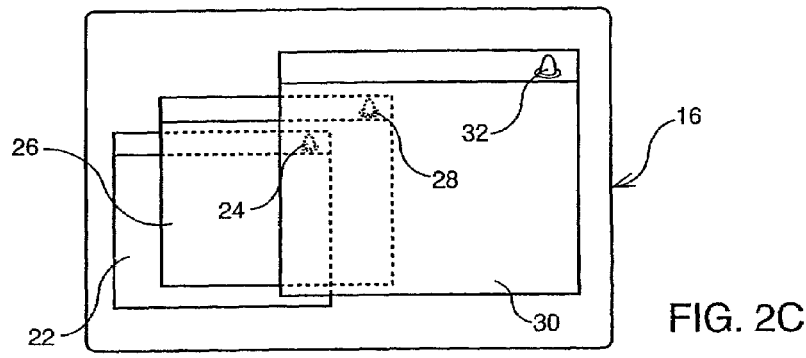

In reference to FIG. 2C, a third window 30 corresponding to a third application program and overlying partially the first and the second windows 22 and 26, is then displayed on screen 16. At the same time a focus buoy 32 is displayed at the top of the window 30.

As already mentioned, data associated with each window being displayed, such as a pointer to the window and the location of the focus buoy, are registered in an entry of table 20 in memory 14. It must be noted that an alternative location (row, column) can be also registered for each focus buoy further to the real location. Such a location could be useful if it happens that the buoy for an overlying window has the same location as the focus buoy corresponding to the window which is overlaid.

Figure 2D:
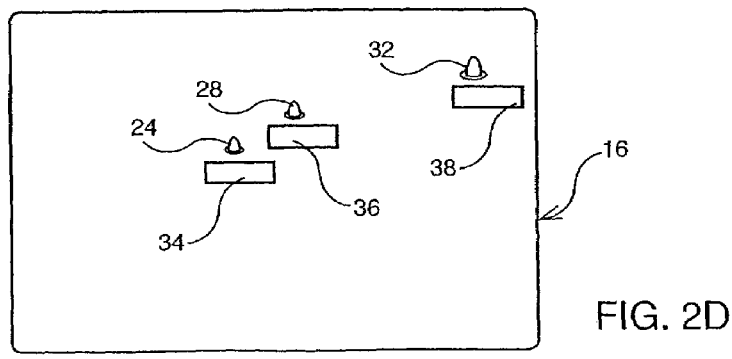

Assuming that the user wants to focus one of the windows 22 and 26 which are overlaid and not visible, he needs only to shake the mouse to get the displaying of all the focus buoys as illustrated in FIG. 2D. Then, he can get the focus of any window by clicking on the focus buoy associated with the selected window. Such a result is easily obtained since the operation of the mouse at this time is properly interpreted by processing unit 10 which sends a command to display subsystem 18 for it to display all the focus buoys the locations of which or their alternative locations are registered in table 20. Note that, in the preferred embodiment illustrated in FIG. 2D, the windows are removed as soon as the mouse is shaken. However, an alternative way would be to display the focus buoys above the windows without removing them.

As illustrated in FIG. 2D, another alternative is to display simultaneously with each focus buoy, a little window such as windows 34, 36 and 38 respectively associated with focus buoys 24, 28 and 32, containing a title related to the corresponding window. Thus, the user will be able to identify rapidly the selected window even if there are many windows already opened on the screen.

Figure 3:
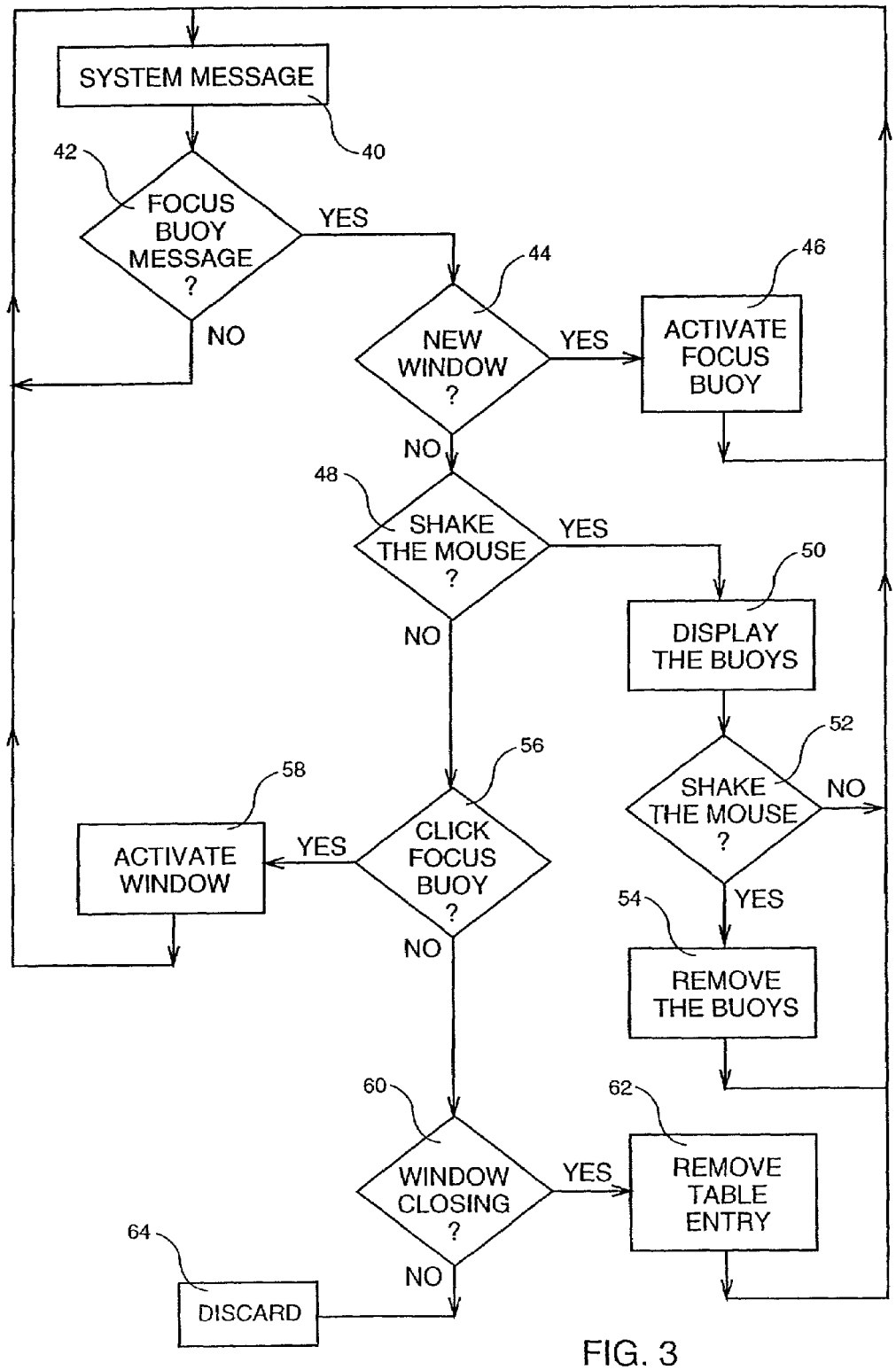
FIG. 3 is a flowchart representing the different steps implemented by the display device according to the invention when a focus buoy is involved.

FIG. 3 illustrates the flow chart of the commands performed by the display device 18 when a message relating to a focus buoy is involved. First of all, a system message is received (step 40) by the display device. It is checked whether this message relates to a focus buoy (step 42). If not, the process loops back to the beginning. If it is a focus buoy message, it is checked whether the message corresponds to a new window (step 44). If so, a focus buoy is associated with the new window by registering data as mentioned above in an entry of table 20 (step 46) and then the process loops back to the beginning.

When the message does not correspond to a new window, it is determined whether the mouse 17 has been shaken (step 48). If so, this means that the user wants to select a window which is not visible and the buoys are all displayed (step 50) as already described in reference to FIG. 2D. Note that little windows containing the titles of the windows may be displayed simultaneously with the buoys as already mentioned.

When the focus buoys are displayed, an alternative consists in shaking the mouse again to remove the buoys when the user no longer wants the buoys displayed. It is therefore checked whether the mouse is again shaken (step 52) and if so, the buoys are removed from the screen (step 54). After removing the buoys or if the mouse is not shaken again, the process loops back to the beginning.

If the mouse has not been shaken, it is determined whether a focus buoy is clicked (step 56) to select a window. If so, the associated window is activated (step 58) before the process returns to the beginning. If no focus buoy is being clicked, the last possibility is to check whether an opened window is to be closed (step 60). If so, the entry of table 20 corresponding to this window is removed from the table (step 62). After that, the process returns to the beginning. It must be noted that, if the message does not relate a window closing, it corresponds to an erroneous message which is discarded (step 64).

The invention claimed is:

1. Data processing system comprising at least a processing unit capable of executing simultaneously a number of application programs, a memory for storing said application programs, a display subsystem for displaying on a screen a plurality of windows associated respectively with a plurality of application programs, each window being able to overlay partially or totally one or several windows already displayed on said screen, and a mouse for moving a cursor to a selected location of said screen;

said system being characterized in that the display subsystem comprises:
a plurality of focus buoys associated respectively with each of the plurality of windows, each focus buoy being displayed at a location on or beside its respective window only when its respective application is open,
a table in said memory for storing the coordinates of which each focus buoy is displayed,
whereby the display subsystem displays each focus buoy at each location defined in said table by shaking said mouse and whereby the user may click any one of the displayed focus buoys to get the focus of its respective window.

2. Data processing system according to claim 1, wherein said table further comprises, for each of said windows displayed on said screen, an identification of said associated application program, a pointer to the corresponding window, and the location of the focus buoy associated with said window.

3. Data processing system according to claim 2, wherein said table further comprises, for each of said windows, an alternative location displayed at any location of the window or beside the window for its respective focus buoy at which to display said focus buoy if the real location is the same as the location of a focus buoy associated with a window being already displayed on said screen.

4. Data processing system according to claim 1, wherein a little window including the title of the window is also displayed with the focus buoy associated with each window when the focus buoys defined in said table are displayed on said screen in response to simply shaking of said mouse.

5. Data processing system according to claim 2, wherein a little window including the title of the window is also displayed with the focus buoy associated with each window when the focus buoys defined in said table are displayed on said screen in response to simply shaking of said mouse.

6. Data processing system according to claim 1, wherein said display subsystem displays the window associated with a focus buoy being displayed in response to simply shaking of said mouse after said focus buoy has been selected and clicked by using said mouse.

7. Data processing system according to claim 5, wherein said display subsystem further displays the window associated with a focus buoy being displayed in response to simply shaking of said mouse after said focus buoy has been selected and clicked by using said mouse.

8. Data processing system according to claim 1 wherein said focus buoys being displayed on said screen are removed from display in response to simply shaking of said mouse a second time after said focus buoys have been displayed in response to simply shaking of said mouse.

9. Data processing system according to claim 4 wherein said focus buoys being displayed on said screen are removed in response to simply shaking of said mouse a second time after said focus buoys have been displayed in response to simply shaking of said mouse.

10. Data processing system according to claim 1, wherein said windows are removed from said screen when said focus buoys are displayed on said screen after said mouse has been shaken.

11. A method of displaying windows in a computer having display subsystem, the method comprising the steps of:
   (a) opening an application, the application opening a window on the display subsystem;
   (b) creating a first focus buoy associated with the window, the first focus buoy displayed on the window;
   (c) storing the location on the display subsystem of the first focus buoy in a memory;
   (d) opening a subsequent application, the subsequent application opening a subsequent window on the display subsystem;
   (e) creating a subsequent focus buoy associated with the subsequent window, the subsequent focus buoy displayed on the subsequent window;
   (f) storing the location on the display subsystem of the subsequent focus buoy in the memory;
   (g) overlaying the first window and the first focus buoy on the display subsystem with the subsequent window thereby making the first focus buoy and all or some of the first window not visible; and
   (h) shaking a mouse connected to the computer and the display subsystem to display the first focus buoy.

12. The method of claim 11, further comprising simultaneously removing the window and the subsequent widow and displaying the first focus buoy and the subsequent focus buoy in response to shaking the mouse.

13. The method of claim 11, further comprising shaking the mouse again to remove the first focus buoy.

14. A method of opening and closing windows in a computer system having a display subsystem, comprising:
   (a) opening a plurality of applications,
   (b) opening at least two windows in the display subsystem, the windows associated with two of the plurality of applications;
   (c) creating at least two focus buoys on the display subsystem, each focus buoy associated with and located on the open window;
   (d) recording the location of the focus buoys in memory;
   (e) layering the at least two windows so that the underlying windows and their respective focus buoys are partially or completely not visible to a user;
   (f) shaking a mouse so that all the underlying focus buoys are displayed on the display; and
   (g) obtaining the focus of a window by clicking on its associated focus buoy.

15. The method of claim 14, further comprising removing the open windows from the display subsystem.

16. The method of claim 14, further comprising displaying a little window having the title of the associated window with each of the displayed focus buoys.

17. The method of claim 16, further comprising removing the focus buoys from the display subsystem by shaking the mouse again.

* * * * *